(12) United States Patent
Nikopoulos et al.

(10) Patent No.: US 9,914,435 B1
(45) Date of Patent: Mar. 13, 2018

(54) VEHICLE WIPER BLADE

(71) Applicants: Charalampos Nikopoulos, Brockton, MA (US); Theodora Nikopoulos, Brockton, MA (US)

(72) Inventors: Charalampos Nikopoulos, Brockton, MA (US); Theodora Nikopoulos, Brockton, MA (US)

( * ) Notice: Subject to any disclaimer, the term of this patent is extended or adjusted under 35 U.S.C. 154(b) by 0 days.

(21) Appl. No.: 15/236,422

(22) Filed: Aug. 13, 2016

(51) Int. Cl.
*B60S 1/38* (2006.01)

(52) U.S. Cl.
CPC ..... *B60S 1/3801* (2013.01); *B60S 2001/3822* (2013.01); *B60S 2001/3831* (2013.01)

(58) Field of Classification Search
CPC .. B60S 1/38; B60S 1/3801; B60S 2001/3827; B60S 2001/3829; B60S 2001/3831; B60S 2001/3834; B60S 2001/3837
USPC .......................................... 15/250.41, 250.48
See application file for complete search history.

(56) References Cited

U.S. PATENT DOCUMENTS

| | | | | |
|---|---|---|---|---|
| 2,179,454 A | * | 11/1939 | Paulus ................ | B60S 1/38 15/186 |
| 4,567,621 A | * | 2/1986 | Alley, Jr. ............ | B60S 1/3801 15/250.03 |
| 5,048,146 A | * | 9/1991 | Cavenago ............ | B60S 1/38 15/250.4 |

FOREIGN PATENT DOCUMENTS

| | | | |
|---|---|---|---|
| DE | 2707703 | * | 8/1978 |
| DE | 3205573 | * | 6/1983 |
| DE | 3912051 | * | 10/1990 |
| FR | 2086834 | * | 12/1971 |
| GB | 1316781 | * | 5/1973 |
| WO | 83/02756 | * | 8/1983 |

OTHER PUBLICATIONS

3M™ Safety Data Sheet for Scotch-Brite™ product 7445 dated Oct. 2, 2014.*
3M™ Abrasive Systems Scotch-Brite™ Hand Finishing Systems brochure dated at printed in 2012.*
Machine translation of description portion of German publication 2707703, published Aug. 1978.*

* cited by examiner

*Primary Examiner* — Gary Graham
(74) *Attorney, Agent, or Firm* — Gulf Coast Intellectual Property Group

(57) ABSTRACT

A vehicle wiper blade configured to both remove aqueous material from a windshield and additionally provide absorption of any aqueous material remaining during the same movement of the vehicle wiper blade. The vehicle wiper blade includes a body being rectangular in shape wherein the body has a first layer and a second layer. The first layer of the body is manufactured from a flexible rubber material and has a perimeter edge operable to contact the windshield. The second layer of the body is manufactured from an abrasive material and is configured to engage the windshield during the same movement of the vehicle wiper blade. The body is secured to a support arm providing structural support thereof.

9 Claims, 1 Drawing Sheet

VEHICLE WIPER BLADE

FIELD OF THE INVENTION

The present invention relates generally to a vehicle wiper blade. More specifically but not by way of limitation, a vehicle wiper blade that includes a first layer and a second layer wherein the first layer and second layer are manufactured from different materials and combine to provide a more effective cleaning of a windshield of a vehicle.

BACKGROUND

As is known in the art, conventional vehicles of all types employ at least one windshield wiper to either remove dirt and debris from the windshield during the driving of the vehicle or are utilized during precipitation events such as rain and/or snow. Conventional windshield wipers are typically operated in pairs and are operably coupled to a support arm wherein the support arm is moved in an oscillating pattern so as to traverse the windshield wipers across the surface of the windshield of the vehicle. Different types of vehicles may employ alternate movement techniques but the outcome is as stated herein above.

One problem with conventional windshield wipers is their construction of just a single material. Conventional windshield wipers are manufactured from a rubber material and are typically formed in an angular shape so as to have a leading edge that is operable to contact a windshield. The wiper blade is flexible and a portion of the body adjacent to the leading edge is further either formed or functions to assist in the removal of precipitation or debris. One problem conventional wiper blade construction is the aforementioned wherein the conventional design does not provide either a material or construction that is operable provide any absorption of the material that has been deposited on the windshield. As such, the conventional wiper blades fail to effectively remove the material that can be absorbed and often a user must oscillate the conventional wiper blades multiple times so as to remove the material such as snow or water off of the windshield. This is especially more prevalent as the conventional wiper blades began to deteriorate from age and sun exposure.

Accordingly, there is a need for a vehicle wiper blade that includes a first material and a second material wherein the second material is operable to provide more effective removal of material on a windshield so as to provide more effective removal thereof.

SUMMARY OF THE INVENTION

It is the object of the present invention to provide a vehicle wiper blade that is operable to remove material from the surface of the windshield of a vehicle wherein the vehicle wiper blade includes a body having a first layer and a second layer.

Another object of the present invention is to provide a vehicle wiper blade configured to remove debris from the surface of a windshield wherein the first layer extends substantially the length of the body.

A further object of the present invention is to provide a vehicle windshield wiper configured to remove matter from a windshield wherein the second layer of the body is adjacent the first layer and is substantially equivalent in length.

An additional object of the present invention is to provide a vehicle windshield wiper that is configured to remove material from the surface of a windshield wherein the first layer is manufactured from rubber.

Yet a further object of the present invention is to provide a vehicle windshield wiper configured to provide cleaning of the outer surface of a windshield of a vehicle wherein the second layer is manufactured from a scouring material such as but not limited to a composite of resin, fiber and minerals.

A further object of the present invention is to provide a vehicle windshield wiper blade configured to clean the surface of a windshield that is cost effective.

Another object of the present invention is to provide a vehicle windshield wiper blade that is operable to more effectively clean a windshield utilizing a first layer and a second layer that has an extended usable lifetime.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
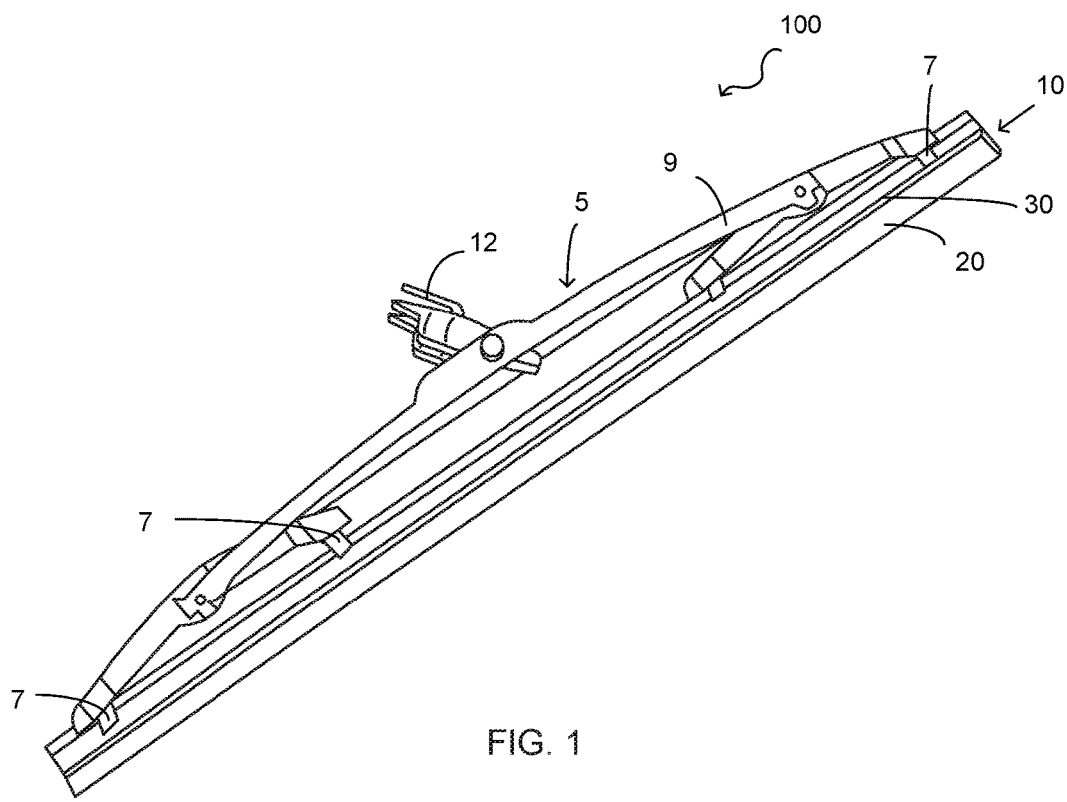
FIG. 1 is a perspective view of the present invention including the support arm thereof.

Referring now to the drawings submitted herewith, wherein various elements depicted therein are not necessarily drawn to scale and wherein through the views and figures like elements are referenced with identical reference numerals, there is illustrated a vehicle wiper blade 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Figure 2:
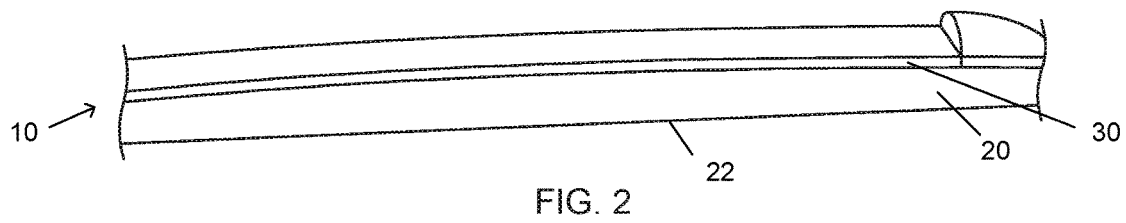
FIG. 2 is a side view of the wiper blade body of the present invention.

Referring in particular to FIGS. 1 and 2 herein, the vehicle wiper blade 100 is illustrated therein. The vehicle wiper blade 100 includes a body 10 that is secured to support arm 5. The support arm 5 is similar to support arms of a conventional wiper blade. The support arm includes an arcuate shaped member 9 that is coupled to the body 10 utilizing fasteners 7. It is contemplated within the scope of the present invention that the support arm 5 could be manufactured in various lengths. Additionally, it is further contemplated within the scope of the present invention that the support arm 5 could be manufactured from a suitable rigid material such as but not limited to a lightweight metal. The fasteners 7 are conventional clip-style fasteners that are configured to releasably secure to the body 10. It is contemplated within the scope of the present invention that the fasteners 7 could be constructed in alternate manners so as to execute the desired function of releasably securing to the body 10. It is additionally contemplated within the scope of the present invention that body 10 is permanently secured to the support arm 5 and provided as a replaceable unit being configured to be secured to member 12.

The body 10 of the vehicle wiper blade 100 includes first layer 20 and second layer 30. The first layer 20 and second layer 30 are secured to each other utilizing suitable durable techniques such as but not limited to chemical adhesion. The first layer 20 of the body 10 is manufactured from a non-absorbent material such as but not limited to rubber. The first layer 20 is configured to provide removal of material from the surface of a windshield of a vehicle by engagement therewith such that the first layer 20 moves the material, or a portion thereof, in the direction of the movement of the vehicle wiper blade 100. The perimeter edge 22 of the first layer 20 is operable to engage the surface of the windshield and the remainder of the first layer 20 flexes so as to provide engagement of the second layer 30 with the surface of the windshield of a vehicle.

The second layer 30 is adjacent the first layer 20 and is configured to be substantially the same length as the first layer 20. The second layer 30 is manufactured from an non-absorbent material such as but not limited to a composite of resin, fiber and minerals. It is contemplated within the scope of the present invention that the second layer 30 could be manufactured from numerous alternate types of non-absorbent materials. The second layer 30 functions to provide more effective removal of matter such as but not limited to bugs and bird fecal matter. The second layer 30 accomplishes the aforementioned objective through the abrasive quality thereof. As previously mentioned the second layer 30 is manufactured from a composite of resins, fiber and minerals so as to provide effective scouring of the surface of a windshield as the vehicle wiper blade 100 traverses thereacross. The combination of the first layer 20 and second layer 30 provides removal of substantially all the matter from a windshield of a vehicle as the first layer 20 effectively sweeps away moisture and the second layer 30 provides an abrasive scouring effect so as to remove any matter that may be adhered to the surface of the windshield. As the body 10 is traversed across the windshield of a vehicle the first layer 20 flexes allowing the second layer 30 to contact the windshield and trail the first layer 20 in a following manner so as to absorb any aqueous material left behind by the first layer 20. It is contemplated within the scope of the present invention that the body 10 could be provided such that the first layer 20 and second layer 30 are provide in alternate sizes and/or ratios with respect to one another.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A vehicle wiper blade comprising:
   a support arm, said support arm being arcuate in shape, said support arm having a plurality of fasteners secured thereto;
   a body, said body having a first layer and a second layer, wherein said first layer being manufactured from rubber and wherein said second layer is manufactured from a composite of resin, fiber and minerals, said second layer being superposed said first layer, said second layer being perpendicular to said first layer, said body being elongated and rectangular in shape, said first layer including a perimeter edge, said perimeter edge configured to engage an outer surface of a windshield; and
   wherein said second layer is manufactured from an abrasive material.

2. The vehicle wiper blade as recited in claim 1, wherein said first layer is flexible and as said first layer is traversed across a windshield the second layer is engaged with the outer surface of the windshield.

3. The vehicle wiper blade as recited in claim 2, wherein said first layer and said second layer are secured utilizing chemical adhesion.

4. A vehicle wiper blade that is configured to both move aqueous matter off the windshield of a vehicle and further provide scouring of adhered matter comprising:
   a support arm, said support arm being arcuate in shape, said support arm having a plurality of fasteners secured thereto, said support arm being configured to be secured to a support member;
   a body, said body having a first layer and a second layer, said body being elongated and rectangular in shape, said first layer having a perimeter edge, said perimeter edge configured to engage the windshield, said first layer being manufactured from a durable flexible material, said second layer being superposed said first layer, said second layer being perpendicular to said first layer; and wherein said second layer is manufactured from an abrasive material.

5. The vehicle wiper blade as recited in claim 4, wherein said second layer is manufactured from a composite of resin, fiber and minerals.

6. The vehicle wiper blade as recited in claim 5, wherein said first layer is flexible and as said first layer is traversed across a windshield the second layer is engaged with the outer surface of the windshield in a following manner.

7. The vehicle wiper blade as recited in claim 6, wherein said first layer and said second layer of said body are secured utilizing chemical adhesion.

8. A vehicle wiper blade that is configured to both remove aqueous material from a windshield of a vehicle and further is configured to provide abrasive removal of matter adhered to the surface of the windshield during the same wiper blade movement comprising:

a support arm, said support arm being arcuate in shape, said support arm having a plurality of fasteners secured thereto, said support arm being configured to be secured to a support member;

a body, said body having a first end and a second end, said body having a first layer and a second layer, said second layer being superposed said first layer, said second layer being perpendicular to said first layer, said body being elongated and rectangular in shape, said first layer having a perimeter edge, said perimeter edge configured to engage the windshield, said first layer being manufactured from a durable flexible material, said second layer being adjacent to said first layer, wherein said body is traversed across the windshield and during traversal of the body said first layer flexes so as to promote engagement of the windshield by said second layer, wherein said second layer is configured to abrasively remove any matter adhered to the windshield; and wherein said second layer is manufactured from a composite of resin, fiber and minerals.

9. The vehicle wiper blade as recited in claim 8, wherein said first layer and said second layer of said body are secured utilizing chemical adhesion.

* * * * *